(No Model.)
F. J. RABBETH.
POWDER FLASK.
No. 404,932. Patented June 11, 1889.
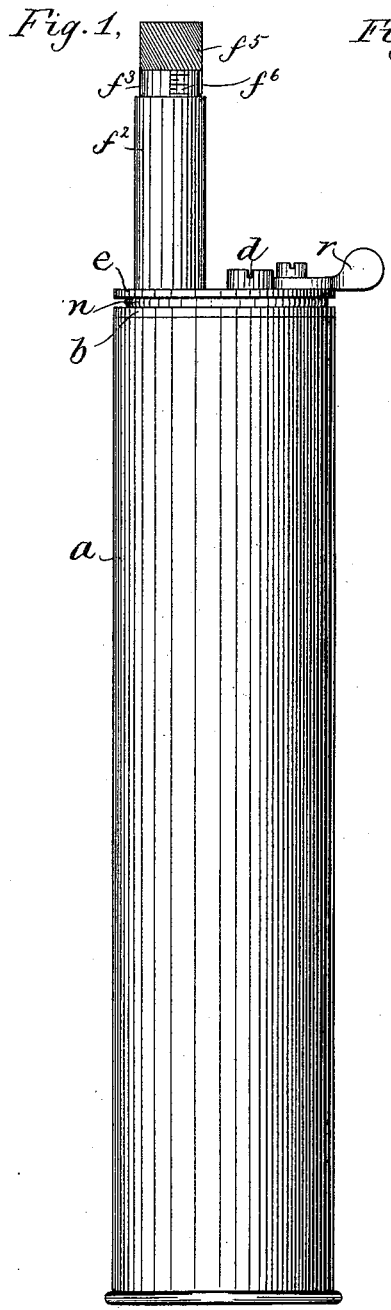
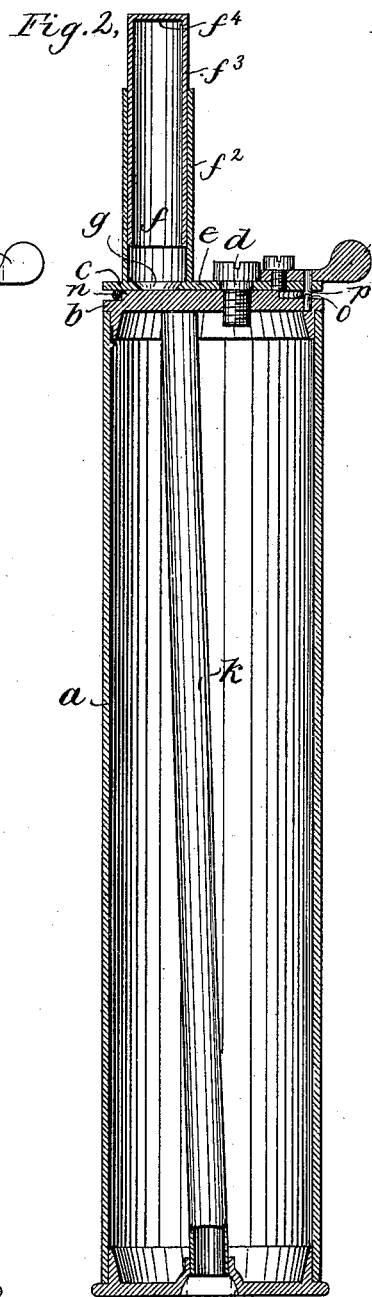
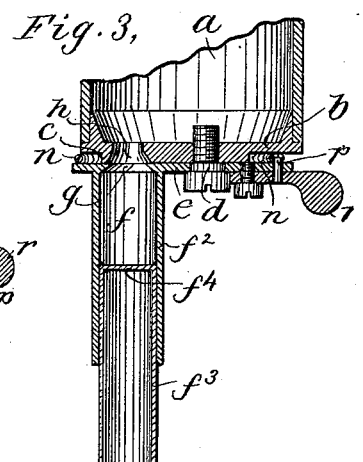
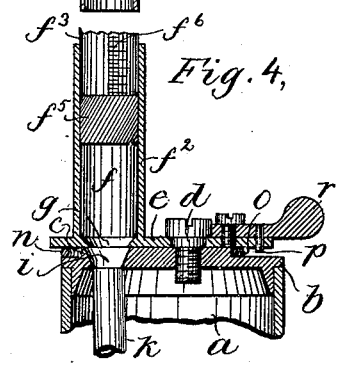
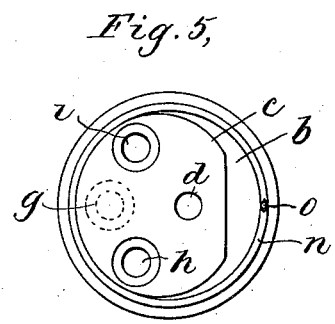
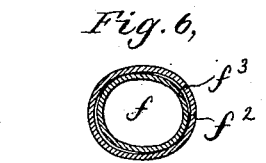
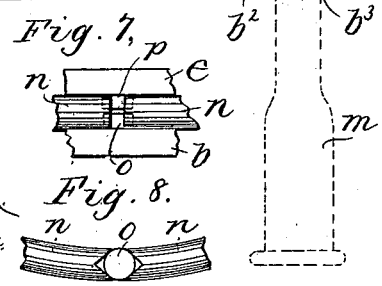
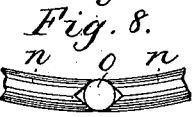
Witnesses.
H. Livermore
Jas. J. Maloney.
Inventor,
Francis J. Rabbeth,
by Jos. P. Livermore
Att'y.

UNITED STATES PATENT OFFICE.

FRANCIS J. RABBETH, OF BOSTON, MASSACHUSETTS.

POWDER-FLASK.

SPECIFICATION forming part of Letters Patent No. 404,932, dated June 11, 1889.

Application filed August 27, 1888. Serial No. 283,828. (No model.)

*To all whom it may concern:*

Be it known that I, FRANCIS J. RABBETH, of Boston, county of Suffolk, and State of Massachusetts, have invented an Improvement in Powder-Flasks, of which the following description, in connection with the accompanying drawings, is a specification, like letters on the drawings representing like parts.

My invention relates to powder-flasks or similar magazines for containing gunpowder or other granular material and delivering measured amounts of greater or less quantity, as may be desired.

One object of the invention is to provide a flask with a measuring-chamber which may be of any desired capacity between certain limits, so that any desired amount or weight of powder may be measured accurately at each operation.

The measuring-chamber is made movable with relation to the body of the flask, and has an inlet-opening co-operating with two ports or openings, one communicating with the interior of the flask or magazine and the other with a discharge-tube by which the charge of powder in the measuring-chamber is delivered into a cartridge-shell or any other desired receptacle.

The measuring-chamber is normally held by a spring with its opening in an intermediate position between the said port-openings, and is movable from such intermediate position against the stress of the spring into its position over either of said openings, according as it is desired to fill the measuring-chamber or to deliver the measured charge therefrom.

The measuring-chamber is shown as consisting of two tubes, one telescopically movable within the other and having a closed end. When the movable tube is inserted in the outer tube with its closed end foremost, it merely forms a stopper to limit the capacity of the outer tube to a greater or less degree, according as the inner tube is inserted a shorter or greater distance, and when a charge exceeding the capacity of the outer tube is required the inner tube may be inserted with its closed end outward, and both tubes will constitute the chamber that receives the powder, said chamber being of greater or less capacity, according as the inner or outer tube is inserted a shorter or greater distance in the outer tube. As a convenient means for holding the inner tube at any desired point in the outer tube, both tubes are made slightly non-circular or oval in cross-section, the inner fitting easily within the outer when the longer and shorter axes of the two ovals or ellipses coincide, but binding or wedging in the outer when turned slightly, so that the longer diameter of the inner tube is brought toward the shorter diameter of the outer tube. The inner tube is preferably knurled or corrugated near its ends to afford a convenient hold for manipulating it when inserting it in either direction and also affording a better frictional hold on the outer tube when turned and locked in position, and it may be provided with longitudinal graduations to indicate the capacity of the measuring-chamber at different positions of the inner tube in the outer tube.

The measuring-chamber has but a single opening, which constitutes both the inlet to receive the powder to be measured and the outlet to deliver the measured powder, being thus unlike the usual measuring-chambers of powder-flasks, which have an inlet at one end controlled by the valve or shut-off and the outlet at the other end commonly controlled merely by the finger of the operator.

The measuring-chambers heretofore made have usually been capable of giving only two or three gradations as to size, and are not extremely accurate even at these gradations.

Figure 1 is a side elevation of a powder-flask embodying this invention; Fig. 2, a longitudinal vertical section thereof, with the measuring-chamber in its normal intermediate position; Fig. 3, a sectional detail showing the parts in the position occupied when the measuring-chamber is being filled from the magazine; Fig. 4, a sectional detail showing the parts in the position occupied when the charge is being delivered from the measuring-chamber; Fig. 5, a plan view of the upper end of the magazine, with the measuring-chamber and connected parts removed; Fig. 6, a transverse section of the measuring-chamber, showing the oval or elliptical shape of the tube somewhat exaggerated; Figs. 7 and 8, enlarged details showing the connection of the spring between the measuring-chamber and main magazine or flask.

The apparatus comprises a flask proper or reservoir $a$, which may be of any desired size, shape, and material, being shown in this instance as a metallic tube closed at the top and bottom by end pieces $b$ $b^2$. The end piece $b$ at the top of the flask has a raised platform or seat $c$, upon which is pivoted at $d$ a plate $e$, that forms a base or support for the measuring-chamber $f$, which is composed of two tubes $f^2$ $f^3$, the latter of which fits and is movable longitudinally, or like a telescope-tube, in the former. The supporting and operating plate $e$ for the measuring-chamber has an opening $g$ just beneath the said chamber, which forms both the inlet to and outlet from said chamber, as will be hereinafter described. The end piece $b$ of the magazine also has in its seat portion a port or opening $h$, communicating directly with the interior of the reservoir $a$, so that when the plate $e$ is turned on its pivot $d$, to bring the opening $g$ into coincidence with the opening $h$, as shown in Fig. 3, and when the flask is inverted, the powder will run from the magazine into the measuring-chamber $f$. Then as the plate $e$ is moved from the position in which the opening $g$ coincides with the opening $h$, the said plate will close the opening $h$ and at the same time the part $c$ of the end piece $b$ will cover and close the opening $g$ of the measuring-chamber, thus retaining the powder in the said measuring-chamber when the flask is again turned into the upright position shown in Fig. 1. The end piece $b$ has another opening $i$, (see Figs. 4 and 5,) communicating with a delivery-tube $k$, (see Fig. 2,) which, as shown in this instance, passes directly through the interior of the magazine $a$, and terminates in the bottom piece $b^2$ thereof, which has a cup-shaped recess $b^3$ to receive the end of the cartridge-shell $m$, as shown in dotted lines, Fig. 2, so that the powder passing down through the tube $k$ will be directed with certainty into the shell. This delivery of the powder is effected by moving the chamber into the position shown in Fig. 4 with the opening $g$ of the chamber over the port $i$ or inlet end of the delivery-tube $k$, while the flask is in its upright position shown in Fig. 2, and the fact that the powder falls a considerable distance from the measuring-chamber into the cartridge shell or receptacle $m$, is advantageous, as it packs the powder more closely in the shell than when poured directly therein, as is commonly done in charging cartridge-shells.

The platform $e$ of the measuring-chamber is normally held with the opening $g$ of said chamber in an intermediate position between the ports $h$ and $i$ in the end piece, as indicated in dotted lines, Fig. 5, by means of a ring-shaped spring $n$, the ends of which are notched or forked, as best shown in Fig. 8, so as to embrace two pins $o$ $p$, the former fixed on the end piece $b$ and the latter on the platform $e$, but so arranged that one pin can pass by the other in either direction, as will be readily understood from Figs. 2 and 7.

Each forked end of the spring $n$ is wide enough to embrace both pins, and either pin alone will form a sufficient rest for the end of the spring, which by its elastic force always tends to bring the two pins together or in position opposite one another, as shown in Fig. 7, and opposes by its elastic force the movement of one pin relative to the other in either direction. For example, if the pin $p$ is moved toward the right with relation to the pin $o$ in Fig. 7, the left-hand end of the spring will remain bearing against the pin $o$ and the right-hand end of the spring will bear against the pin $p$, and if the pin $p$ be moved toward the left the right-hand end of the spring will bear against the pin $o$ and the left-hand end will bear against the pin $p$ and tend to move it back again into line with the pin $o$.

The disk $e$ is shown as provided with a thumb-piece or handle $r$ to facilitate turning the said disk on its pivot $d$ in either direction against the stress of the spring $n$, and the moment the handle $r$ is disengaged by the operator the spring will return the disk $e$ to its normal intermediate position and effectually close both the magazine and the measuring-chamber, as before described.

The construction of said measuring-chamber, by which its capacity may be varied to any desired degree of minuteness, is as follows: The inner tube $f^3$ almost exactly fills the bore of the outer tube $f^2$, and is closed at one end, as shown at $f^4$, Figs. 2 and 3. If, therefore, the tube $f^3$ is inserted in the tube $f^2$, with the closed end $f^4$ innermost, as shown in Fig. 3, it acts merely as a stopper in the said tube $f^2$, the chamber $f$ then being wholly in the part $f^2$, and being limited as to size by the distance that the tube $f^3$ is inserted into the tube $f^2$. By inserting the tube $f^3$ nearly to the bottom of the tube $f^2$ the capacity of the chamber is reduced to a minimum, and by gradually withdrawing the tube $f^3$ it is increased to nearly the full capacity of the tube $f^2$. To enlarge the chamber still further the tube $f^3$ is turned end for end, as shown in Fig. 2, in which case the bore of the tube $f^3$ also forms a part of the chamber $f$, which may be gradually increased by drawing the tube $f^3$ farther and farther out from the position shown in Fig. 2, until finally the capacity of the measuring-chamber is nearly the combined capacity of the tubes $f^2$ $f^3$. As a convenient means for fastening the tube $f^3$ at any desired position in the tube $f^2$, both tubes are made slightly oval or elliptical, as shown in Fig. 6, one fitting easily within the other when the ellipses are in similar position, but binding when turned, so that the longer axis of the inner approaches the shorter axis of the outer tube, as shown in Fig. 6. The ends of the inner tube $f^3$ are corrugated or knurled, as shown at $f^5$, Fig. 1, and the space between the knurled portions is shown at $f^6$ as graduated to indicate the capacity of the chamber for different positions of the tube. Two sets of graduations may be employed—one to indicate the capacity when the tube is inserted closed end inward and the other when it is inserted open end inward—and the knurled portion $f^5$ outside of the tube $f^2$ facilitates the manipulation of the tube $f^3$, while the knurling inside the tube $f^2$ increases the grip when the tube $f^3$ is turned to fasten it after adjusting its position in the outer tube.

The magazine may be filled by wholly removing the inner tube and turning the plate $e$ to the positions in which the openings $g$ and $h$ coincide, as in Fig. 3, but with the flask in its upright position, so that the powder may be poured through the tube $f^2$ and openings $g\ h$ in the magazine.

I claim—

1. A flask comprising a magazine or receptacle, combined with a measuring-chamber composed of an outer and inner tube, the said inner tube being permanently closed at one end and being detachable from the outer tube and adjustable longitudinally therein when either its closed or its open end is inserted in said outer tube, substantially as and for the purpose described.

2. The combination of the magazine provided with a port-opening and discharge-passage with a measuring-chamber provided with an opening constituting both inlet and outlet thereto, said measuring-chamber being movable with relation to the magazine, whereby its opening may be placed in communication with the port-opening of the said magazine or with the said discharge-passage, substantially as described.

3. The combination of the magazine provided with a port-opening and discharge-passage with a measuring-chamber provided with an opening constituting both inlet and outlet thereto, said measuring-chamber being movable with relation to the magazine, whereby its opening may be placed in communication either with the port-opening of said magazine or with the discharge-passage, and a spring by which the measuring-chamber is normally retained with its opening out of coincidence with said port and discharge-passage, substantially as described.

4. The combination, with a magazine, of a measuring-chamber composed of an inner and outer tube movable longitudinally, one relative to the other, and slightly oval in cross-section, the longer external diameter of the inner tube being slightly greater than the shorter internal diameter of the outer tube, whereby a slight rotation of the inner tube fastens it within the outer tube, substantially as and for the purpose described.

5. The combination of the magazine provided with a port communicating with the interior of the magazine and a discharge-passage, with a measuring-chamber movable with relation to said port and discharge-passage, and having an opening which may be placed in communication with either one of them, substantially as and for the purpose described.

6. The combination of the magazine having an end portion provided with a seat and passages therethrough, with a measuring-chamber and supporting-plate therefor pivoted on said seat and provided with an opening into the said measuring-chamber, said plate closing the passages in said seat except when moved to place the opening in the measuring-chamber in communication with one or the other of said passages, substantially as described.

7. The combination of the magazine having an end portion provided with a seat and passages therethrough, with a measuring-chamber and supporting-plate therefor pivoted on said seat and provided with an opening into the said measuring-chamber, said plate closing the passages in said seat except when moved to place the opening in the measuring-chamber in communication with one or the other of said passages, and a spring the ends of which engage projections, one connected with the magazine and the other with the supporting-plate for the measuring-chamber, as set forth, the said spring opposing the movement of the chamber in either direction, substantially as described.

In testimony whereof I have signed my name to this specification in the presence of two subscribing witnesses.

FRANCIS J. RABBETH.

Witnesses:
ALVIN BURLEIGH,
FRANK W. RUSSELL.